United States Patent [19]

Knoll et al.

[11] Patent Number: 4,888,699
[45] Date of Patent: Dec. 19, 1989

[54] SYSTEM OF NAVIGATION FOR VEHICLES

[75] Inventors: Peter Knoll, Ettlingen; Winfried König, Pfinztal; Peter Rapps, Karlsruhe, all of Fed. Rep. of Germany

[73] Assignee: Robert Bosch GMBH, Stuttgart, Fed. Rep. of Germany

[21] Appl. No.: 274,654

[22] Filed: Nov. 21, 1988

Related U.S. Application Data

[63] Continuation of Ser. No. 022,807, filed as PCT DE86/00150 on Apr. 9, 1986, published as WO86/07143 on Dec. 4, 1986, abandoned.

[30] Foreign Application Priority Data

May 30, 1985 [DE] Fed. Rep. of Germany ....... 3519276

[51] Int. Cl.[4] ............................................. G06F 15/50
[52] U.S. Cl. .................... 364/449; 340/990; 340/995; 73/178 R
[58] Field of Search ............... 364/443, 444, 449, 521; 340/988, 990, 995; 73/178 R

[56] References Cited

U.S. PATENT DOCUMENTS

| | | | |
|---|---|---|---|
| 4,437,085 | 3/1984 | Salant | 364/444 |
| 4,613,913 | 9/1986 | Phillips | 360/51 |
| 4,631,678 | 12/1986 | Angermüller et al. | 364/449 |
| 4,646,015 | 2/1987 | Phillips | 33/361 |
| 4,660,037 | 4/1987 | Nakamura | 364/443 |
| 4,686,642 | 8/1987 | Buxton et al. | 364/507 |
| 4,688,176 | 8/1987 | Hirata | 364/449 |
| 4,734,863 | 3/1988 | Honey et al. | 364/449 |
| 4,737,916 | 4/1988 | Ogawa | 364/443 |
| 4,763,270 | 8/1988 | Itoh et al. | 364/449 |
| 4,774,671 | 9/1988 | Itoh et al. | 364/449 |
| 4,774,672 | 9/1988 | Tsunoda et al. | 364/449 |

FOREIGN PATENT DOCUMENTS

| | | | |
|---|---|---|---|
| 3341679 | 5/1984 | Fed. Rep. of Germany. | |
| 57-211510 | 12/1982 | Japan | 364/449 |
| 58-52516 | 3/1983 | Japan | 364/444 |

Primary Examiner—Gary Chin
Attorney, Agent, or Firm—Frishauf, Holtz, Goodman & Woodward

[57] ABSTRACT

A system of navigation for vehicles is proposed, which is provided with a device (14) for representing a road map as well as with a composite navigation apparatus (10, 11, 12) for the continuous instantaneous determination of the location of the vehicle and with a location display (16) on the representation of the road map. Deviations of the location from the course of the roads on the road map are detected and corrected. In order to be able to input a desired trip route (21) into the navigation system without an additional representation of the road map, prior to the beginning of the trip the desired trip route is traced by hand, using an input device (17, 18) connected to a trip route memory, with a wand (19) on the existing representation (14) of the road map, and thereby stored in the trip route memory (13). (Fig. 1).

9 Claims, 2 Drawing Sheets

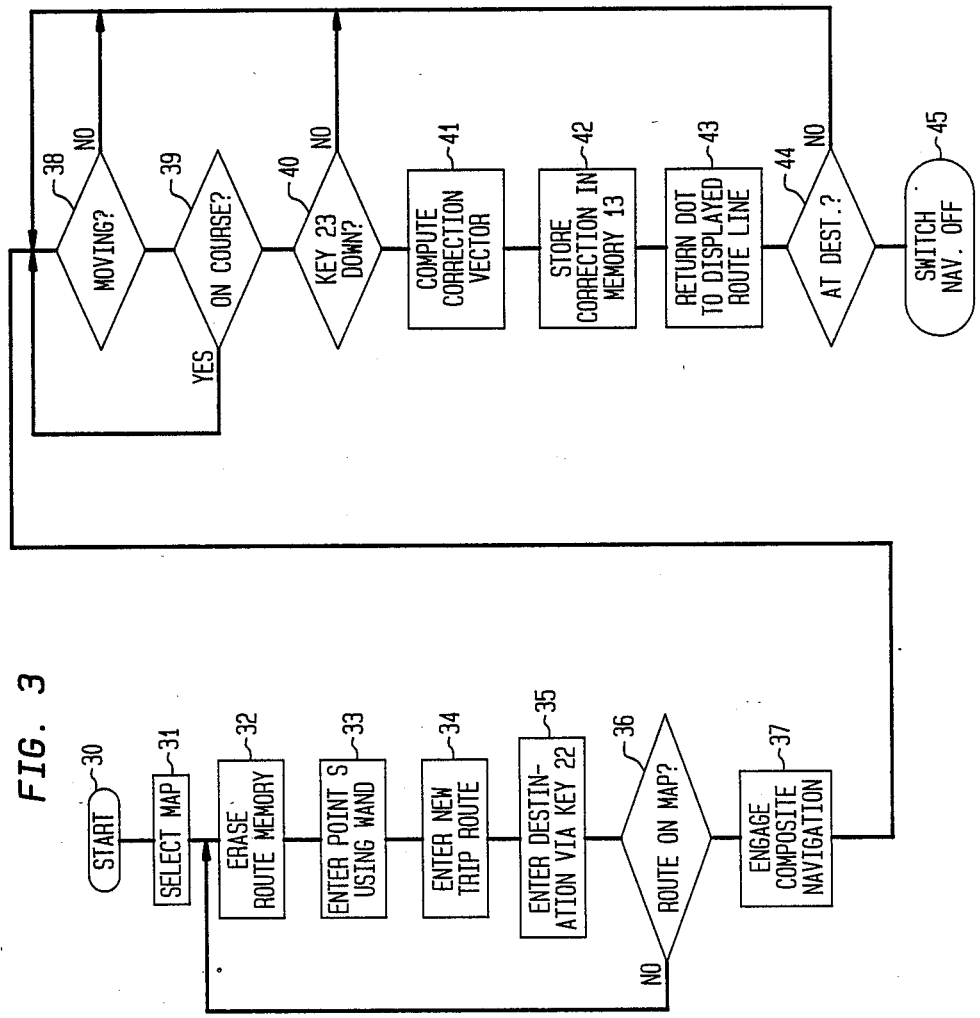

SYSTEM OF NAVIGATION FOR VEHICLES

This application is a continuation of application Ser. No. 022,807, filed as PCT DE86/00150 on Apr. 9, 1986, published as WO86/07143 on Dec. 4, 1986, now abandoned.

PRIOR ART

The invention relates to a system of navigation for vehicles. In a known system of this type (German patent disclosure document DE-OS 29 47 470), it is proposed that maps or road maps be projected onto a screen, with the particular position of the vehicle as it drives along a route being indicated by a position indicator on the representation of roads on the map. Deviations of the indicated positions from the roads shown on the road map are detected by a correction device and corrected via a regulating circuit in such a manner that the indicated vehicle position is returned to the route. However, this navigation apparatus does not have the capability of entering a desired route into the equipment electrically and storing it in memory.

In another system of navigation for vehicles (German patent disclosure document 33 41 679), it is known before beginning a trip to use an input apparatus and a road map stored in it to read the desired trip route into the navigation apparatus and store it in memory, by tracing it with an encoding wand. During the drive, the input trip route is then represented on an additional display device, and the instantaneous location of the vehicle is also marked in the display device, at least intermittently. A disadvantage here is that in order to show the trip route and to input the trip route from a road map, separate devices are required, because the trip route that has been input and stored in memory cannot be shown on the road map itself.

With the present invention the goal is to combine the illustration of the road map, the inputting of a desired trip route, the display of the input trip route, and the instantaneous location of the vehicle all in only one location in the vehicle.

ADVANTAGES OF THE INVENTION

The system of navigation for vehicles according to the invention and having the characteristics of the main claim has the advantage that in addition to the incorporation of the particular location of the vehicle in the reprsentation of the road map, the desired trip route can also be input by hand at this point into the navigation system and stored in memory.

It is particularly advantageous if during the trip, in order to ascertain deviations, the data of the stored trip route are compared continuously with the data ascertained by the navigation apparatus for the particular location of the vehicle, and displayed. If deviations occur, the instantaneous location of the vehicle, which is visually displayed on the representation of the road map, is returned to the trip route stored in memory. A further advantageous feature of this invention is that after the inputting of the trip route into the trip route memory, by actuating an acknowledgement switch, the trip route stored in memory is incorporated into the representation of the road map. The result is control over the correct trip route input, and additionally during the trip, because of the incorporated instantaneous location of the vehicle, a good overview is gained as to how the trip route will continue, for the sake of properly orienting the vehicle in good time at intersections, turns, traffic islands and the like.

For the representation of the road map, a screen on which the road map is projected is preferably used. This can be done, for example, with the aid of a microfilm reader or by the use of a television tube by means of still pictures, and specific excerpts from the map can be shown on the screen by projection or by still pictures. In the representation of the road map or an excerpt with the microfilm reader, the picture memory comprises a microfilm magazine, while contrarily if still pictures are represented, these are conceivable in the form of a video cassette or compact disc. It is particularly advantageous if the desired trip route is input into the trip route memory with the aid of a transparent table located in front of the screen, in which table the coordinates of the wand placed on the table are continuously detected electrically as the desired trip route is traced on the representation of the road map, and stored in the trip route memory.

If there are deviations of the displayed vehicle location from the trip route, the return to the trip route stored in memory can be carried out automatically on a continuous basis by the navigation system, or by actuation of a correction key. This kind of individual correction by the driver is useful, for example, if the driver recognizes prominent landmarks along the route.

DRAWING

One exemplary embodiment of the invention is shown in the drawing and explained in further detail in the ensuing description. Shown are:

FIG. 1, the system of navigation according to the invention for a vehicle, in the form of a block circuit diagram;

FIG. 2, the schematic representation of a display and input device with a composite navigation means connected to it, and FIG. 3, a flow chart for the operation of the system of navigation.

DESCRIPTION OF THE EXEMPLARY EMBODIMENT

Figure 1:
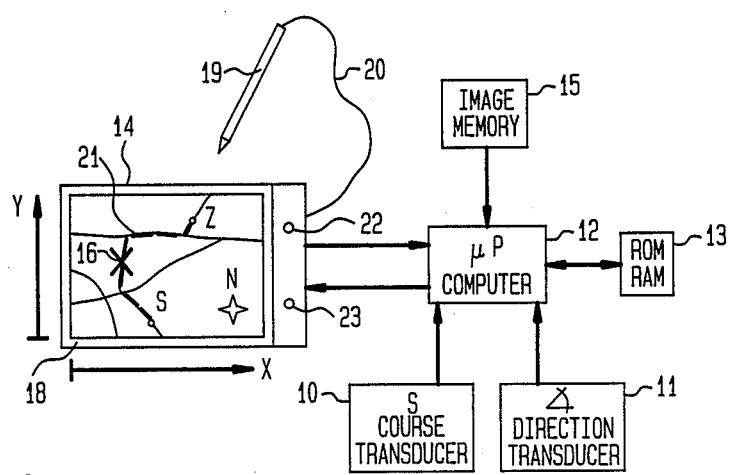
Figure 2:
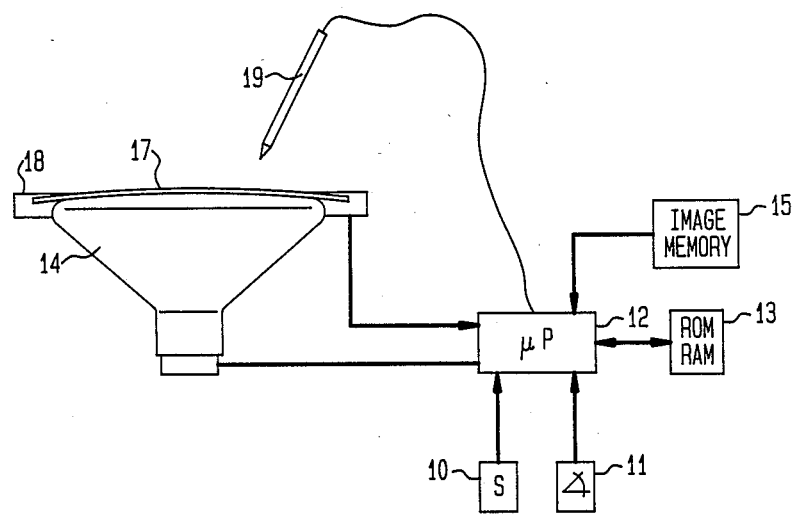

The system of navigation for motor vehicles shown in FIG. 1 and 2 is provided with a composite navigation apparatus, which comprises a road course transducer 10, a driving direction transducer 11, a computer 12 and a data memory 13. As the road course transducer, pulse transducers of a tachometer or corresponding transducers on the vehicle wheels can be used, which may possibly already be present in the vehicle, for example for a trip data computer or for an antilock brake system. As the driving direction transducer 11, a magnetometer or an electronic compass may be used, or a transducer that detects the rotation of the vehicle steering wheel, which in combination with the signals of the course transducer 10 detects a change in the driving direction. The signals of the course transducer 10 and of the driving direction transducer 11 are supplied via connections to the computer 12, where they are processed, or stored temporarily in the data memory 13, which is also connected to the computer 12. Also connected to the computer 12 is a device 14 for representing a road map, which cooperates with a picture memory 15, which is likewise to be triggered via the computer 12. The device 14 for representing a road map may comprise a changing frame for inserting transparent road maps into it with illumination from behind, or it can comprise a screen onto which road map or excerpts of maps are projected onto the screen in the manner of a microfilm reader, or as shown in FIG. 2 it may comprise a picture tube on which the desired road map or map excerpt is represented as a still picture. As the picture memory 15, a map magazine, a microfilm magazine for projections of pictures or a video cassette or compact disc can be used for storing still pictures in memory. If a picture tube is used as the device 14 for representing the roads, then in the still picture of the road map selectd from the picture memory 14, via the composite navigation apparatus, the instantaneous location 16 of the vehicle is also visually displayed on the representation of the particular road map, as shown in FIG. 1. If the road map is projected on the screen of a device 14, this location 16 can be incorporated via an additional device, as provided in German patent disclosure document DE-OS 29 47 470, the additional device being connected to the composite navigation apparatus.

As FIG. 2 shows, a transparent table 17 is located directly in front of the screen of the picture tube 14, the table being held in a frame 18, and on the opposite sides being connected to voltage. By means of an imperceptible mesh network of conductor tracks, the entire surface of the table 17 is divided in the X and Y direction in such a manner that when a wand 19 is placed upon it the X and Y coordinates of the placement point on the table 17 are detected electrically and supplied to the computer 12. Instead of the mesh network, a transparent resistance surface or the like can also be used as the table. The frame 18 together with the table 17 and the wand 19 forms an input device, with which the desired trip route can be traced by hand on the representation of the road map. The wand 19 is connected via a line 20 to an electrical circuit in the frame 18 (FIG. 1) or is connected directly to the computer 12 (FIG. 2). With the aid of this input device, a desired trip route 21, shown in FIG. 1 in broken lines, between a starting point S and a destination point Z can be read into the data memory 13, in that the coordinates of the wand 19 placed on the table 17, as the desired trip route 21 is traced, are detected electrically on a continuous basis and are stored in the data memory 13 in the form of electrical data, via the computer 12. The data memory 13 thus serves within a predetermined range as a trip route memory. By means of an acknowledgement key 22 of the input device, the portion of the data memory 13 used as a trip route memory can be erased, and the beginning of the trip route input as well as its end can be detected. The input device is also provided with a correction key 23, by means of the actuation of which deviations of the detected location 16 of the vehicle from the particular trip route 21 can be corrected.

With the aid of the flow chart shown in FIG. 3, the mode of operation of the system of navigation according to FIGS. 1 and 2 will now be explained in further detail. When the system of navigation is switched on prior to the beginning of the trip, the program is started at step 30. First, in program step 31, the desired road map is selected from the picture memory 15, which is done in a manner not shown by the actuation of appropriate operating keys on the picture memory or on the input device. In the same manner, the scale of the road map selected is detected and stored in memory. The selected road map is now represented on the screen of the picture tube 14. In the next program step 32, by actuation of the acknowledgement key 22, the portion of the data memory 13 used as a route memory is now erased. Next, in step 33, by placement of the wand 19 on the table 17, the location of the vehicle is detected as the starting point S and fed into the route memory via the computer 12. Then, with the wand 19 on the table 17, the desired trip route 21 is traced by hand on the road map shown on the screen, and in so doing the coordinates of the wand 19 on the table 17 are detected continuously in the form of electrical signals and stored in memory, via the computer, in the trip route memory. In the next program step 35, finally, the destination point Z at the end of the trip route is detected by again actuating the acknowledgement key 22 and is stored in memory in the data memory 13. Also, in the next step 36, the stored trip route is now shown on the screen in broken lines and optionally intermittently incorporated via the computer 12, and the input trip route is thereby checked off. If this trip route 21 deviates from the roads on the road map, then this incorrectly stored trip route is immediately recognizable by the driver and can be corrected, in that by reactuating the acknowledgement key 22 the inputting of the trip route is repeated, using program steps 32-36.

If a correction of the now-stored trip route is no longer required, then in the next program step 37 the composite navigation is switched on, and now the signals of the course transducer 10 and the driving direction transducer 11 are detected and processed continuously by the computer 12. In the course of this, a check is made in the next step 38 as to whether signals or signal changes have been received from these transducers. As long as this is not the case, then the location of the vehicle has not yet changed; in other words, in program step 38 the beginning of the trip is still awaited. As soon as transducer signals for the road course or drive direction transducer 10 or 11 then appear, which enable recognition that the vehicle is in motion, then with the aid of these signals the distance from the starting point and the new driving direction are each ascertained in the computer 12, and the new location of the vehicle is stored temporarily in the data memory 13. Also in this program step 39, the ascertained location of the vehicle is compared with the data of the trip route stored in memory, and a check is made whether the vehicle is still located on the input trip route. As long as this is the case, the vehicle movements are cyclically detected via a program loop and are compared with the previously specified trip route. At the same time in program step 39, the particular location of the vehicle, ascertained by the composite navigation system, is represented on the screen 14 by a mark 16.

If it is determined in program step 39 that the location ascertained by the composite navigation system deviates from the input trip route by a fixed input amount or a variable amount, then this deviation can be corrected in program step 40 by the actuation of a correction key 23. If the correction key is not depressed, however, then the program jumps back into the loop with the program steps 38, 39 and 40. Contrarily, if the correction key 23 is depressed, then in program step 41 the computer 12, from the deviation and from the road course distance that has been traveled, ascertains a correction value for the composite navigation apparatus, and in program step 42, this correction value is first stored in memory in the data memory 13. Also, in step 43, the mark 16 for the instantaneous location of the vehicle on the representation of the road map is now returned to the trip route 21 stored in memory on the screen of the picture tube 14. In the program step 44, a check is made as to whether the destination Z stored in the data memory 13 has been reached. As soon as that is the case, then in program step 45 the composite navigation is switched off. However, as long as this is not the case, then in a program loop the composite navigation is continued with the program steps 38–44, so that the driver can continuously monitor the instantaneous location of the vehicle on the representation of the road map on the screen. If the trip is ended prematurely, then the driver must actuate the acknowledgement key 22, and then he can input a new trip route.

The correction key 23 can optionally be embodied such that for example after actuation it can lock into position, and that in this manner the correction and return of the instantaneous location of the vehicle, represented by the mark 16, on the stored trip route is performed continuously and automatically by the navigation system. On the other hand, if deviations from the trip route are processed in program steps 41 and 42 in order to calculate and temporarily store the correction values, then in program step 43 not only a correction of the location on the screen 14 but also the following data of the composite navigation apparatus can be corrected for determining the location of the vehicle. Thus it is attained that the composite navigation apparatus is continuously recalibrated, and this can be ascertained from the previously ascertained deviations from the programmed trip route. With the correction key 23, it is accordingly possible to determine when the correction value for the composite navigation apparatus should be recalculated and taken into account. It is thus also possible for intended deviations from the stored trip route, for example resulting from detours due to construction, to be omitted from the correction cycle of the navigation system with program steps 41–43, by not actuating the correction key 23, so that consequently, via the loop having the program steps 38 and 39, only the instantaneous vehicle location is ascertained and displayed. The program of the navigation system according to FIG. 3 presents the driver with the opportunity of performing the correction and return of the vehicle position to the input trip route individually upon recognizing prominent landmarks, such as intersections, forks in the road, city squares or buildings, by actuating the correction key 23.

We claim:

1. A combination navigation and continuous route-vs-position display system for vehicles having
    means (14) for representing a road map,
    means (12,13) for continuously displaying on said map instantaneous vehicle position,
    means (17,19,22) immediately adjacent said map means (14) for entering a continuous sequence of points representing an origin (S), a destination (Z), and intermediate points, thereby determining a desired trip route (21) therebetween;
    means (13), coupled to said entering means, for storing said sequence of points during a trip as said desired trip route;
    means (10,11,12,13), coupled to said position displaying means, for detecting and measuring vehicle displacement, and for updating said displayed vehicle position (16) in accordance with said measured displacement, thereby displaying an updated measured position;
    means (12,13), coupled to said updating means, for detecting deviation of said updated position from a point on said desired route; and
    means (12,23,40–43) for continuously correcting any unintentional deviation, of said updated measured position from a point on said desired, previously determined, route, resulting from error in said vehicle displacement detecting and measuring means, and for thereby adjusting and returning said displayed position (16) to an adjacent point on said previously determined and presumptively actual route (21).

2. A navigation and display system according to claim 1, wherein
    during the trip, in order to ascertain said deviations, the data of the stored trip route (21) are continuously compared (39) with the data ascertained by the vehicle displacement measuring means (10, 11, 12), for the measured position of the vehicle and displayed, and, upon the occurrence of deviation, the instantaneous position (16) of the vehicle visually displayed on the representation of the road map (14) is returned to, and adjusted (41–43) to coincide with an adjacent point on, the predetermined trip route (21) stored in said storing means.

3. A navigation and display system according to claim 1, wherein
    after the inputting of the trip route (21) into the trip route storing means (13), the stored trip route (21) is prominently displayed, superimposed upon the representation of the road map (14) by actuating an acknowledgement key (22) provided for this purpose.

4. A navigation and display system according to claim 1, wherein
    the road map is projected on a screen (14).

5. A navigation and display system according to claim 4, wherein
    only one desired excerpt from the road map is projected onto the screen (14).

6. A navigation and display system according to claim 4, wherein
    said storing means comprises a trip route memory (13); and
    said entering means comprises
        a transparent table (17) located in front of said map means (14),
        a wand (19) having a tip which can be placed on the table (17) for tracing of the desired trip route on the representation of the road map (14);
        and means for continuously ascertaining the coordinates of said wand tip during said tracing and storing a sequence of said coordinates in said trip memory as a route.

7. A navigation and display system according to claim 2, wherein
    the return of the displayed position (16) of the vehicle to the stored trip route (21) is performed by actuation of a correction key (23).

8. A navigation and display system according to claim 2, wherein
    the return of the displayed position (16) of the vehicle to the stored trip route (21) is continuously performed automatically.

9. A navigation and display system according to claim 2, wherein
    the ascertained deviation of the vehicle position (16) from the point on the stored trip route is temporarily stored in a RAM (13) and is processed for ascertaining a correction value, with which subsequent data generated by the vehicle displacement measuring means are corrected, in order to determine the subsequent position of the vehicle.

* * * * *